United States Patent
Schreiner

[11] Patent Number: 5,880,408
[45] Date of Patent: Mar. 9, 1999

[54] METHOD AND APPARATUS FOR COMPENSATING FOR WEIGHT OF FUEL IN A PAYLOAD MEASUREMENT SYSTEM

[75] Inventor: Christian Schreiner, Peoria, Ill.

[73] Assignee: Caterpillar Inc., Peoria, Ill.

[21] Appl. No.: 831,446

[22] Filed: Mar. 31, 1997

[51] Int. Cl.6 .............................. G01G 9/00; G01G 19/08
[52] U.S. Cl. ............................ 177/136; 177/1; 73/1.13
[58] Field of Search ............................ 177/1, 136, 137, 177/138, 139, 141; 73/1.13

[56] References Cited

U.S. PATENT DOCUMENTS

| 4,312,416 | 1/1982 | Hoyerman | 177/50 |
|---|---|---|---|
| 4,635,739 | 1/1987 | Foley et al. | 177/45 |
| 4,673,047 | 6/1987 | Harbour | 177/136 |
| 4,819,183 | 4/1989 | O'Brien et al. | 364/509 |
| 4,835,719 | 5/1989 | Sorrells | 364/567 |
| 4,872,120 | 10/1989 | Orloff et al. | 364/509 |
| 4,918,619 | 4/1990 | Orloff et al. | 364/509 |
| 4,935,885 | 6/1990 | McHale et al. | 364/567 |
| 5,182,712 | 1/1993 | Kyrtsos et al. | 364/424.07 |
| 5,247,834 | 9/1993 | Woss | 73/453 |
| 5,449,864 | 9/1995 | Beatty et al. | 177/25.14 |
| 5,610,372 | 3/1997 | Phillips et al. | 177/136 |
| 5,659,470 | 8/1997 | Goska et al. | 177/141 |

Primary Examiner—Randy W. Gibson
Attorney, Agent, or Firm—David M. Masterson; Steve D. Lundquist

[57] ABSTRACT

A method and apparatus to determine the payload in a mobile machine by measuring the total weight of the mobile machine, the fuel in a fuel tank on the mobile machine, and the payload. The weight of the fuel is determined as the machine operates, and the actual weight of the payload is determined by subtracting the weight of the fuel and the weight of the mobile machine.

15 Claims, 5 Drawing Sheets

METHOD AND APPARATUS FOR COMPENSATING FOR WEIGHT OF FUEL IN A PAYLOAD MEASUREMENT SYSTEM

TECHNICAL FIELD

This invention relates generally to a method and apparatus for determining a payload in a mobile machine; and more particularly, to a method and apparatus for compensating for the weight of fuel in a mobile machine to better determine the payload.

BACKGROUND ART

Payload measurement systems for mobile machines are well known in the art. In particular, payload measurement systems for mobile machines adapted to carry loads over distances, e.g., dump trucks, are well known in the art.

One common method for measuring payloads in mobile machines is to measure the pressure being applied to the suspension system of the mobile machine. For example, in U.S. Pat. No. 4,635,739, Foley et al disclose a payload monitor that senses the pressure applied to the front and rear suspension struts of a mobile machine, e.g., a truck. By calculating the differential pressure between an empty truck and a loaded truck, the payload can be determined.

However, a substantial weight carried by a mobile machine is the fuel stored in the fuel tank. The weight of the fuel is included in the total measurement of a suspension-based payload measurement system. As the mobile machine operates, the fuel is consumed and the initial weight of the fuel decreases. This change in fuel weight can be significant and causes error in the payload measurement.

The present invention is directed to overcoming one or more of the problems as set forth above.

DISCLOSURE OF THE INVENTION

In one aspect of the present invention, a method for measuring a payload in a mobile machine is disclosed. The method includes the steps of measuring the combined weight of the payload, fuel, and mobile machine, determining the weight of the fuel, and subtracting the weight of the fuel and the mobile machine from the combined weight.

In another aspect of the present invention, a method for measuring a payload in a mobile machine is disclosed. The method includes the steps of determining a first fuel weight, measuring a mobile machine weight without a payload, determining a calibration factor, measuring a combined weight of the payload, fuel, and mobile machine, determining a second fuel weight, and subtracting the calibration factor and second fuel weight from the combined weight.

In still another aspect of the present invention, an apparatus for measuring a payload in a mobile machine is disclosed. The apparatus includes a payload measurement system connected to the mobile machine, and a control system adapted to receive a signal from the payload measurement system, determine a fuel weight, and determine the weight of the payload.

BEST MODE FOR CARRYING OUT THE INVENTION

Figure 1:
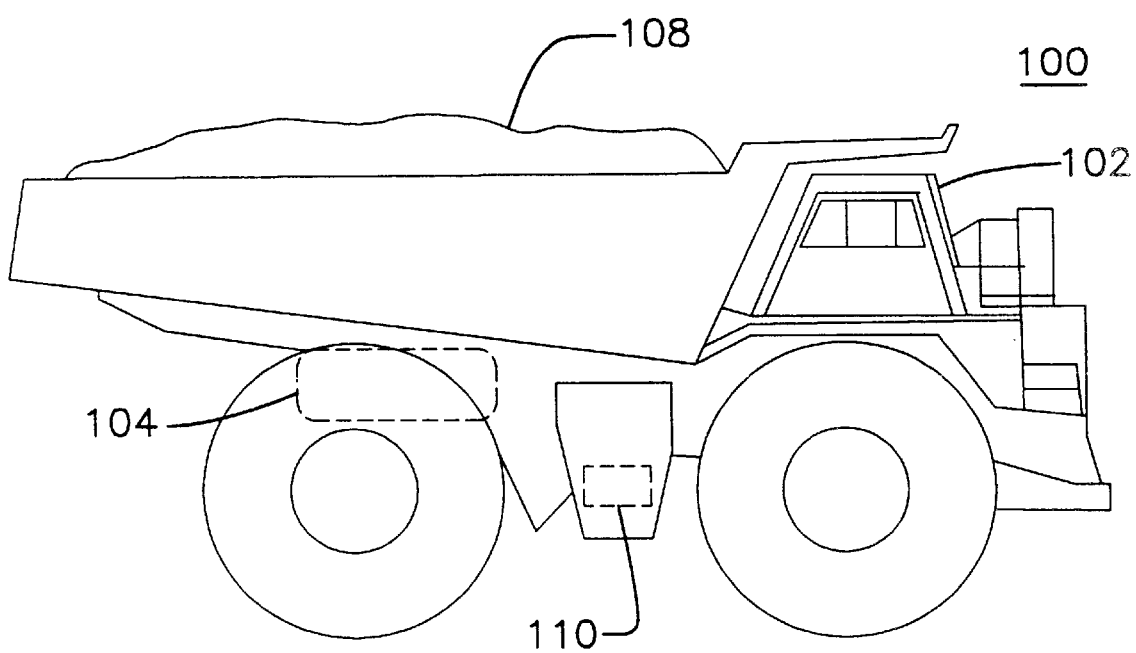
FIG. 1 is a diagrammatic illustration of a mobile machine used for hauling a payload.
Figure 2:
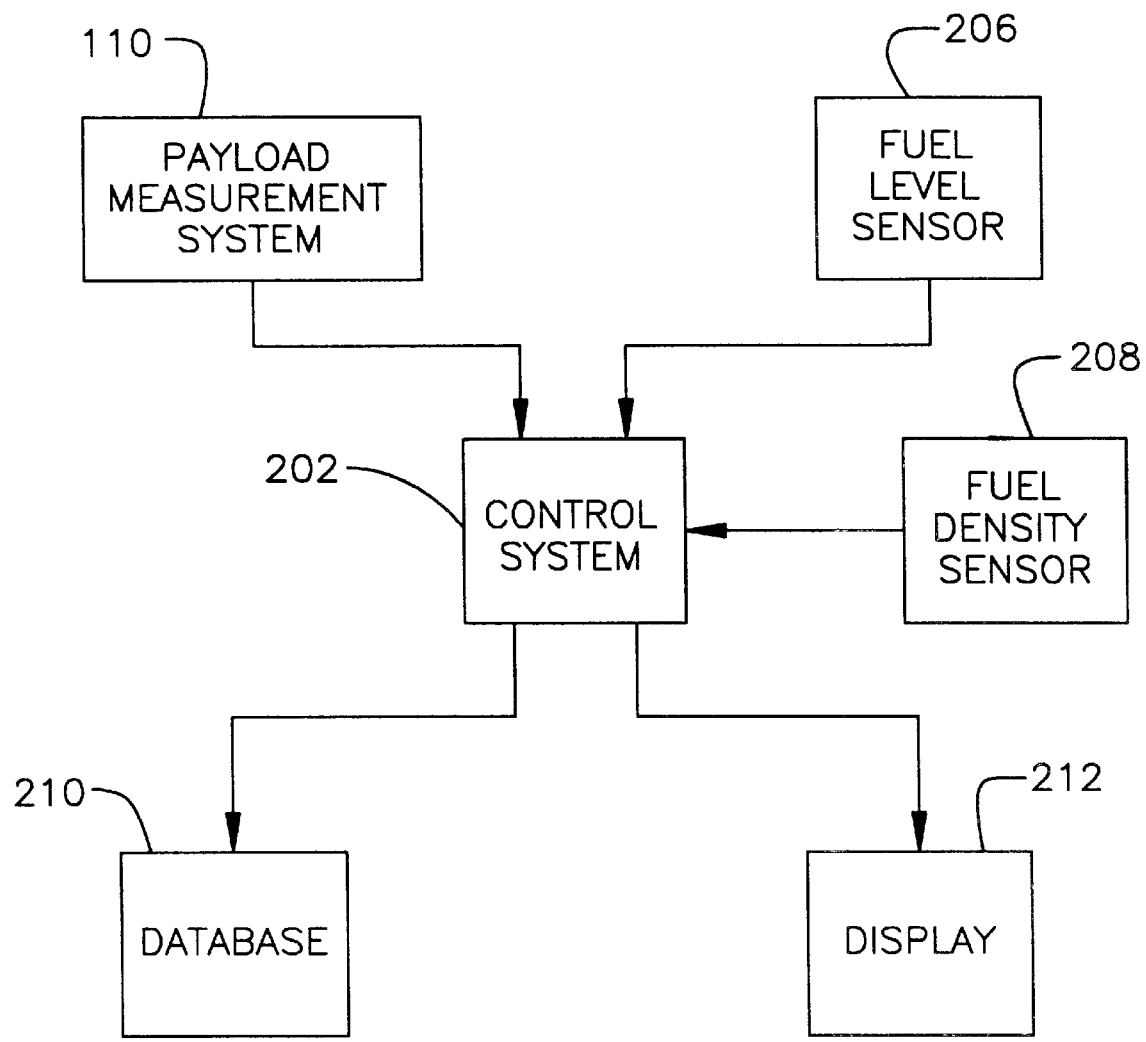
FIG. 2 is a block diagram of an embodiment of the present invention.

Referring to the drawings, and in particular to FIGS. 1 and 2, an apparatus for measuring a payload 108 in a mobile machine 102 is shown. The mobile machine 102 in FIG. 1 is depicted as an off-road mining truck that is used to haul a payload, e.g., ore, overburden, rock. However, it is to be understood that other types of mobile machines used to haul payload, e.g., on-highway trucks, dump trucks, logging trucks, may be used equally well with the present invention.

Referring to FIG. 1, the mobile machine 102 includes a fuel tank 104. The volume capacity of the fuel tank 104 is sufficient to hold a significant weight in fuel. For example, a Caterpillar 793 off-road mining truck can hold approximately one and one-half tons of fuel.

A payload measurement system 110 is located on the mobile machine 102. In one embodiment, the payload measurement system 110 measures the pressure applied to the suspension system (not shown) of the mobile machine 102. In the one embodiment, the payload measurement system 110 measures the combined weight of the mobile machine 102, the fuel, and the payload 108.

The weight of the mobile machine 102 is predetermined and the weight of the payload is determined by subtracting the mobile machine weight from the combined weight measured by the payload measurement system 110. However, the weight of the fuel changes as the mobile machine 102 operates and consumes fuel. The present invention compensates for the variable weight of the fuel to determine the weight of the payload 108 more accurately.

Referring to FIG. 2, a control system 202 is located on the mobile machine 102. Preferably, the control system 202 includes at least one microprocessor. The control system 202 receives a weighting signal from the payload measurement system 110 representing the combined measured weight of the mobile machine 102, the fuel, and the payload 108.

A fuel level sensor 206 located in the fuel tank 104 senses the fuel level in the tank and delivers a fuel level signal to the control system 202.

In one embodiment of the present invention, a fuel density sensor 208 located in the fuel tank 104 senses the density of the fuel in the tank and delivers a fuel density signal to the control system 202. In another embodiment, a predetermined value of fuel density is used. For example, the predetermined value may represent an average density of the fuel. The density of the fuel may vary substantially. For example, fuels refined for summer use vary in density from fuels refined for winter use.

Advantageously, the control system 202 determines the actual weight of the payload 108 by compensating for the weight of the mobile machine 102 and the weight of the fuel.

In one embodiment of the present invention, the control system 202 delivers an output signal representing payload weight information to a database 210, which stores the information. The database 210 may be located on the mobile machine 102 or at a remote location.

The control system 202 may additionally deliver the output signal to a display 212. The display 212 may be numeric, graphic, or any other suitable type to indicate the weight of the payload 108. The display 212 may be located on the mobile machine 102 or at a remote location.

Figure 3:
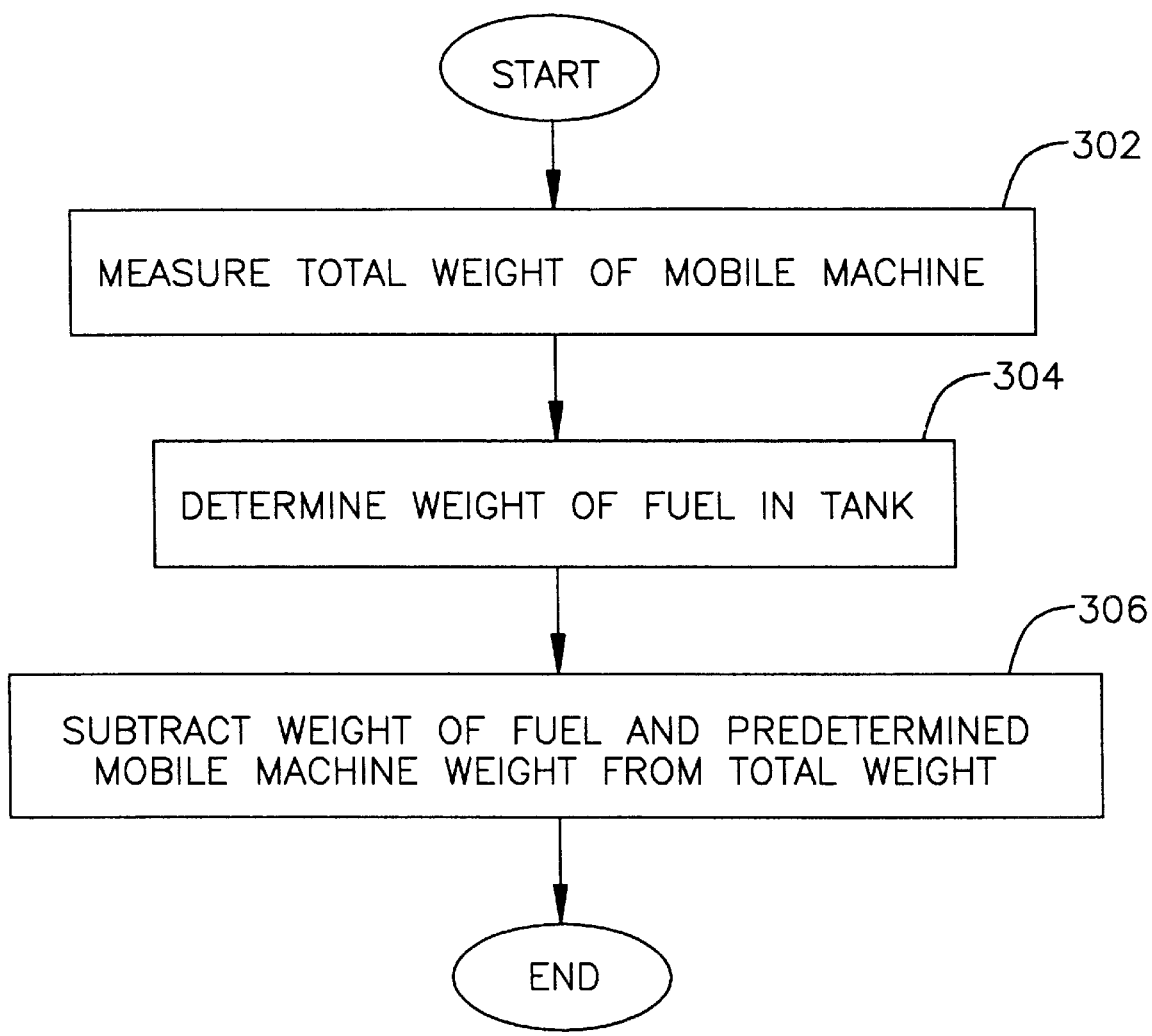
FIG. 3 is a flow diagram illustrating one aspect of the present invention.
Figure 4:
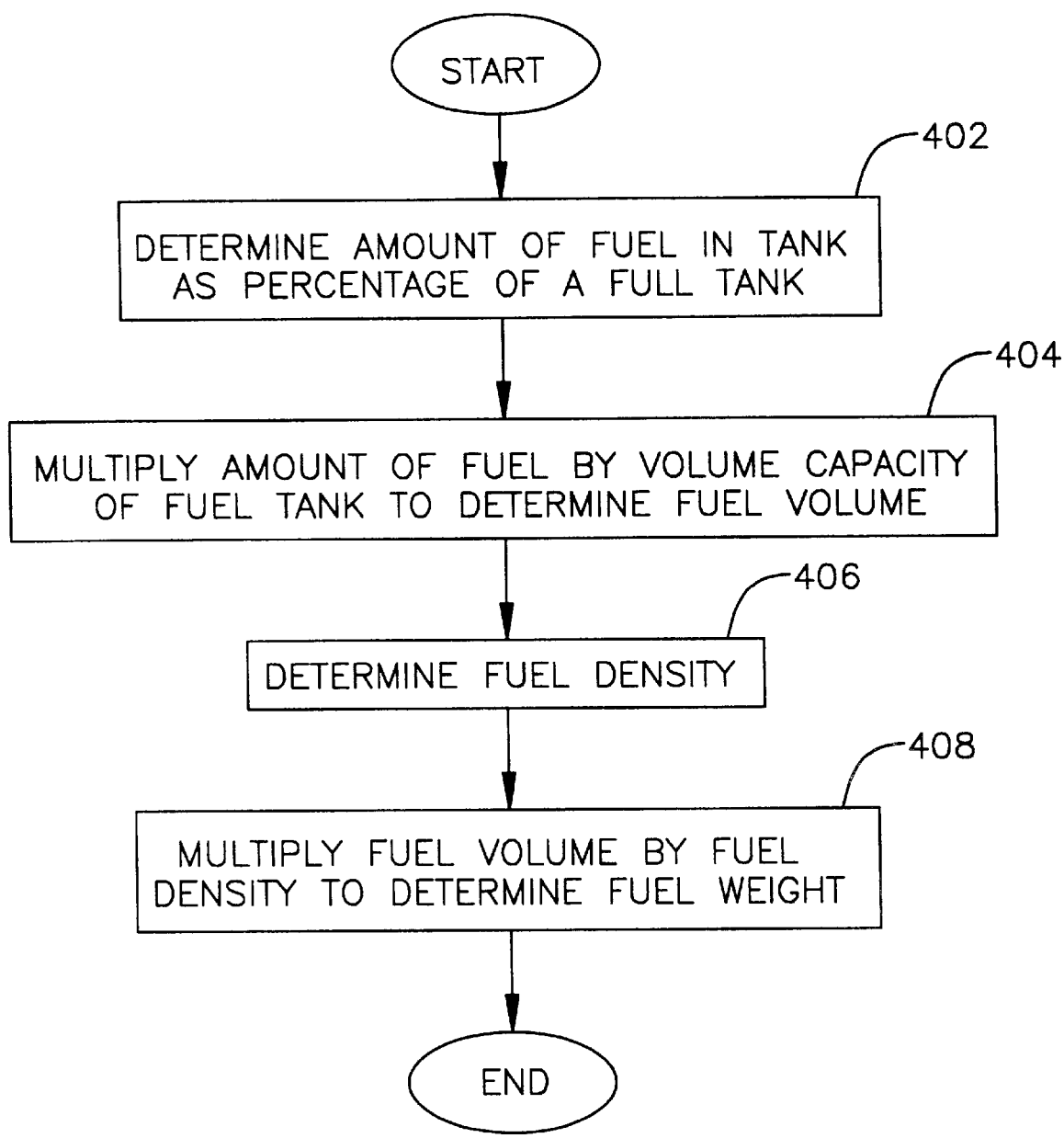
FIG. 4 is a flow diagram illustrating a method of determining fuel weight.

Referring to FIGS. 3 and 4, a method for measuring a payload 108 in a mobile machine 102 is shown. Preferably, the method for measuring a payload is contained in a program stored in a memory (not shown) in the control system 202.

In FIG. 3, in a first control block 302, the total weight of the mobile machine 102 is measured by the payload measurement system 110. For example, in a mobile machine 102 having a suspension-based payload measurement system 110, the total weight includes the combined weight of the mobile machine 102, the fuel, and the payload 108.

In a second control block 304, the weight of the fuel in the fuel tank 104 is determined. The method for determining the weight of the fuel is explained in more detail below with respect to FIG. 4.

The weight of the payload is determined in a third control block 306 by subtracting the weight of the fuel and the predetermined weight of the mobile machine 102 from the total weight.

Referring now to FIG. 4, in a first control block 402, the amount of fuel in the fuel tank 104 is determined as a percentage of a full tank. For example, a tank that is one half full has 50% of a full tank.

In a second control block 404, the fuel volume is determined by multiplying the amount of fuel by the known volume capacity of the fuel tank 104.

Program control then proceeds to a third control block 406, where the fuel density is determined. In one embodiment of the present invention, a fuel density sensor 208 located in the fuel tank 104 senses the fuel density. In another embodiment, the fuel density is predetermined as the average fuel density.

In a fourth control block 408, the fuel weight is determined by multiplying the fuel volume by the fuel density.

Figure 5:
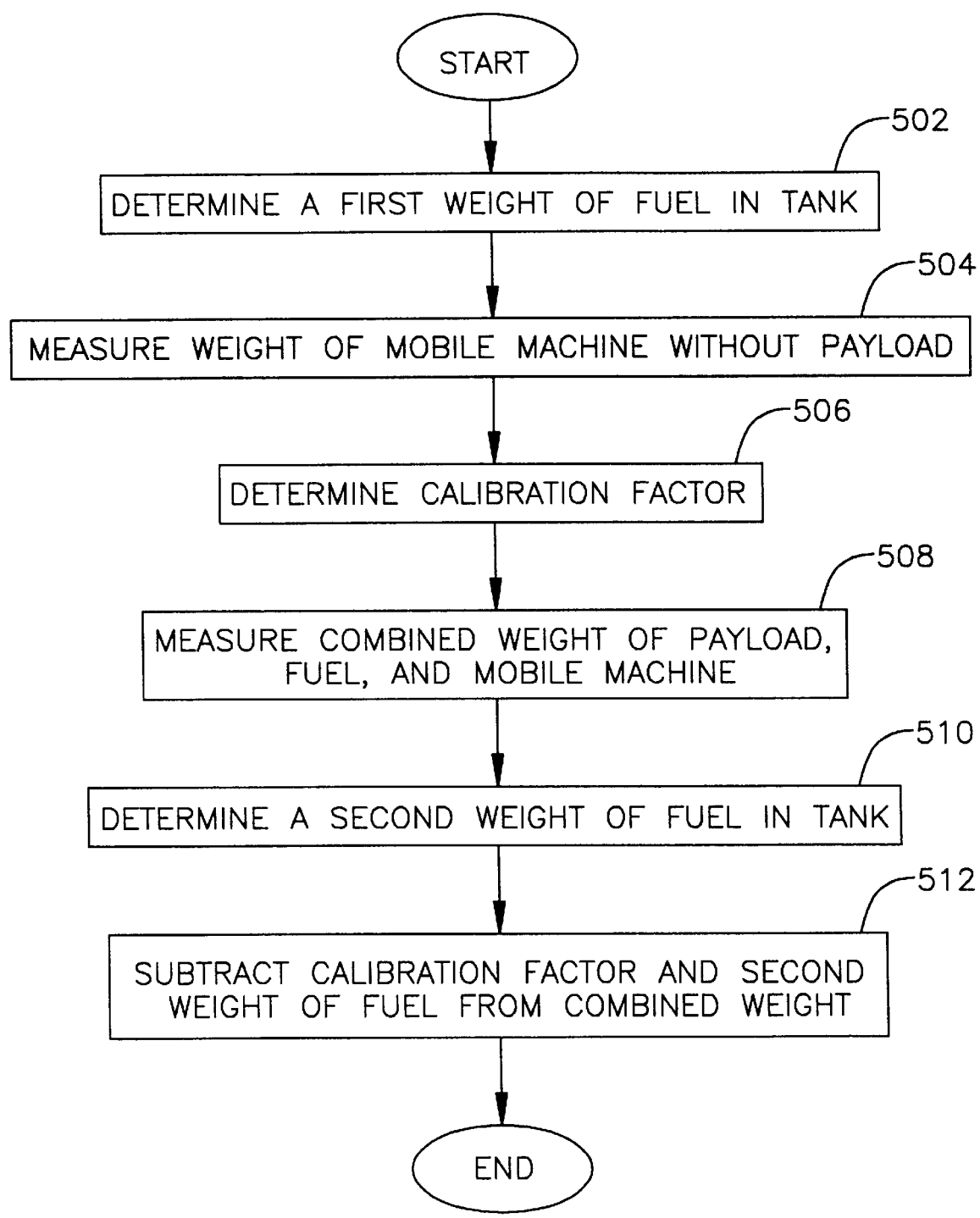
FIG. 5 is a block diagram illustrating another aspect of the present invention.

Referring now to FIG. 5, another embodiment of a method of the present invention is shown. In a first control block 502, a first weight of fuel in the fuel tank 104 is determined. The weight of the mobile machine 102 without a payload 108 is then measured in a second control block 504. In a third control block 506, a calibration factor is determined.

The calibration factor determined in the third control block 506 compensates for the weight of the mobile machine 102, and for other variables that contribute to the total weight measured by the payload measurement system 110. For example, the weight of an operator and any other passengers in the mobile machine 102 are incorporated into the calibration factor. As another example, the mobile machine 102 may have additional weight from snow, ice, or dirt. These variables are included in the calibration factor.

In a fourth control block 508, the combined weight of the mobile machine 102, the fuel, and the payload 108 is measured. Control then proceeds to a fifth control block 510, where a second weight of fuel is determined. By determining the first weight of fuel during calibration, and the second weight of fuel during operation, the change in total weight due to the fuel supply being consumed is compensated for when determining the actual payload 108.

In a sixth control block 512, the calibration factor and the second determined weight of fuel is subtracted from the combined weight to determine the weight of the payload 108.

INDUSTRIAL APPLICABILITY

As an example of the effect that the weight of fuel can have on a payload measurement system 110, a Caterpillar 793 off-road mining truck has an empty weight of 144,000 kg and can carry a payload of 232,500 kg. The fuel tank capacity on this type of truck is 3,785 liters. Assuming a fuel density of 900 kg/m$^3$, a full tank of fuel weighs 3,400 kg, which is 1.5% of the weight of the payload. As the truck operates, the fuel supply is consumed and the diminishing weight of the fuel adds error to the payload measurement.

Other aspects, objects, and features of the present invention can be obtained from a study of the drawings, the disclosure, and the appended claims.

I claim:

1. A method for measuring a payload in a mobile machine having a fuel tank, including the steps of:

determining a calibration factor as a function of a current mobile machine weight;

measuring a combined weight of said payload, fuel in said fuel tank, and said mobile machine;

determining a fuel weight; and compensating for a change in said combined weight as a function of said fuel weight and said calibration factor.

2. A method, as set forth in claim 1, wherein the step of determining said fuel weight includes the steps of:

determining a fuel volume in said fuel tank;

determining a fuel density; and multiplying said fuel volume by said fuel density.

3. A method, as set forth in claim 2, wherein the step of determining said fuel volume includes the steps of:

determining an amount of fuel in said fuel tank as a percentage of a full load fuel tank; and multiplying said amount of fuel by a predetermined volume capacity of said fuel tank.

4. A method, as set forth in claim 2, including the step of measuring said fuel density.

5. A method, as set forth in claim 2, wherein said fuel density is an average density.

6. A method for measuring a payload in a mobile machine having a fuel tank, including the steps of:

determining a first fuel weight in said fuel tank;

measuring a mobile machine weight without a payload;

determining a calibration factor in response to said first fuel weight and a current mobile machine weight;

measuring a combined weight of said payload, said fuel, and said mobile machine;

determining a second fuel weight; and compensating for a change in said combined weight as a function of said second fuel weight and said calibration factor.

7. A method, as set forth in claim 6, wherein the steps of determining said first and said second fuel weights includes the steps of:

determining a fuel volume in said fuel tank;

determining a fuel density; and multiplying said fuel volume by said fuel density.

8. A method, as set forth in claim 7, wherein the step of determining said fuel volume includes the steps of:

determining an amount of fuel in said fuel tank as a percentage of a full load fuel tank; and multiplying said amount of fuel by a predetermined volume capacity of said fuel tank.

9. A method, as set forth in claim 7, including the step of measuring said fuel density.

10. A method, as set forth in claim 7, wherein said fuel density is an average density.

11. An apparatus for measuring a payload in a mobile machine having a fuel tank, comprising:

a payload measurement system connected to said mobile machine, said payload measurement system being adapted to measure a combined weight of said payload and fuel in said fuel tank;

means for determining a calibration factor said calibration factor being a function of a current weight of said mobile machine; and a control system connected to said mobile machine, said control system being adapted to receive a signal from said payload measurement system, determine an actual fuel weight and responsively determine the weight of said payload as a function of said combined weight, change in said actual fuel weight and said calibration factor.

12. An apparatus, as set forth in claim 11, including a fuel level sensor located in said fuel tank.

13. An apparatus, as set forth in claim 11, including a fuel density sensor located in said fuel tank.

14. An apparatus, as set forth in claim 11, including a database adapted to receive a payload weight signal from said control system.

15. An apparatus, as set forth in claim 11, including a display adapted to receive a payload weight signal from said control system.

* * * * *